May 13, 1941.     V. I. ZELOV ET AL     2,242,189
AUTOMATIC MOLDING PRESS
Original Filed June 5, 1937     4 Sheets-Sheet 4
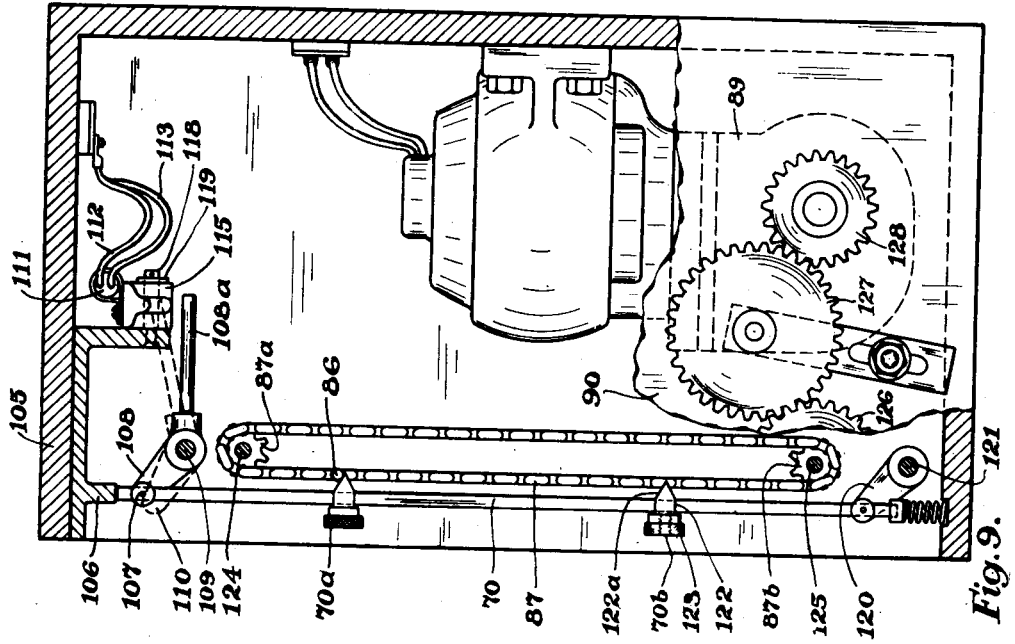
INVENTORS
VICTOR I. ZELOV
WILLIAM STRAUSS
BY Augustus D. Stoughton
ATTORNEY Patented May 13, 1941

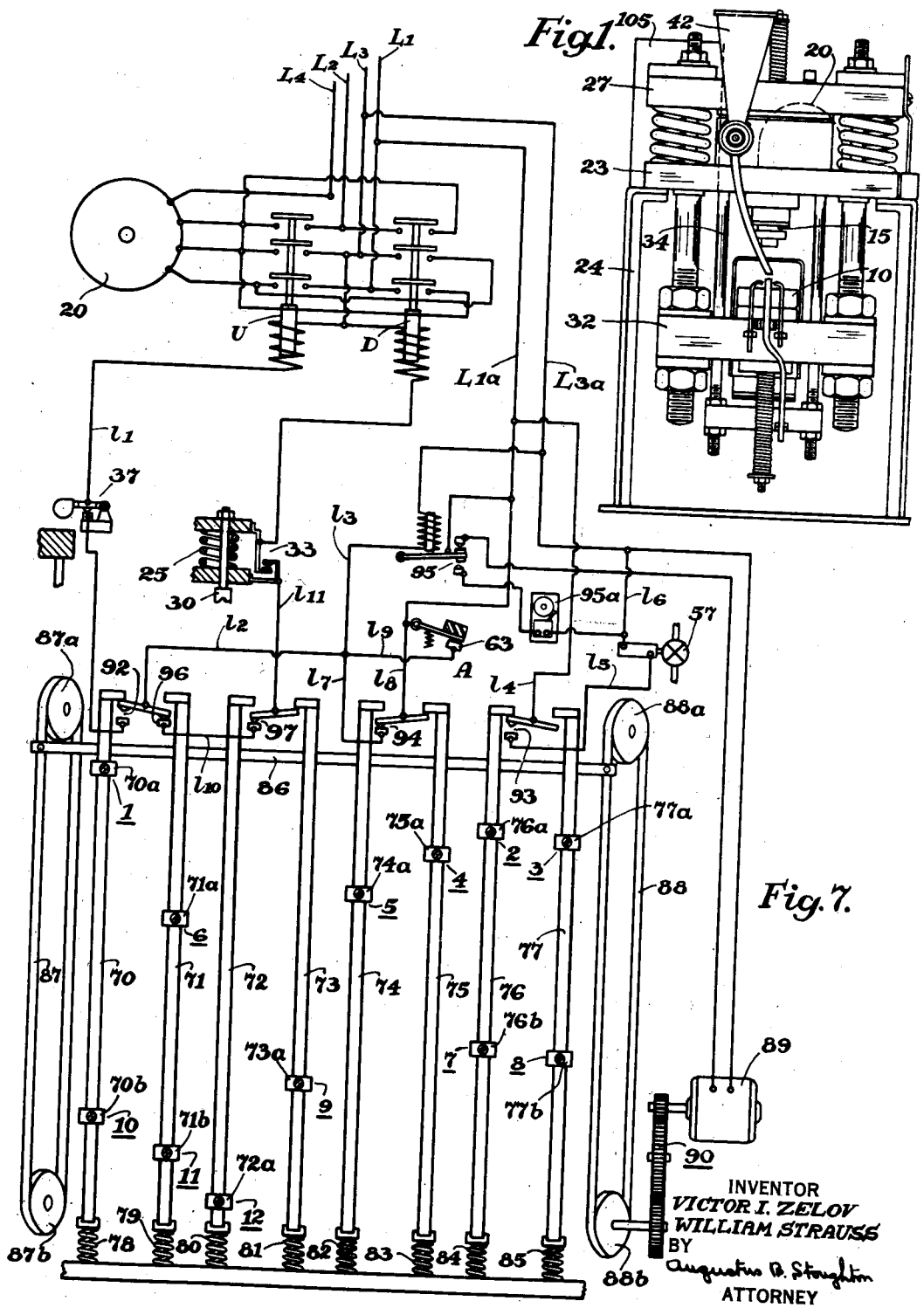

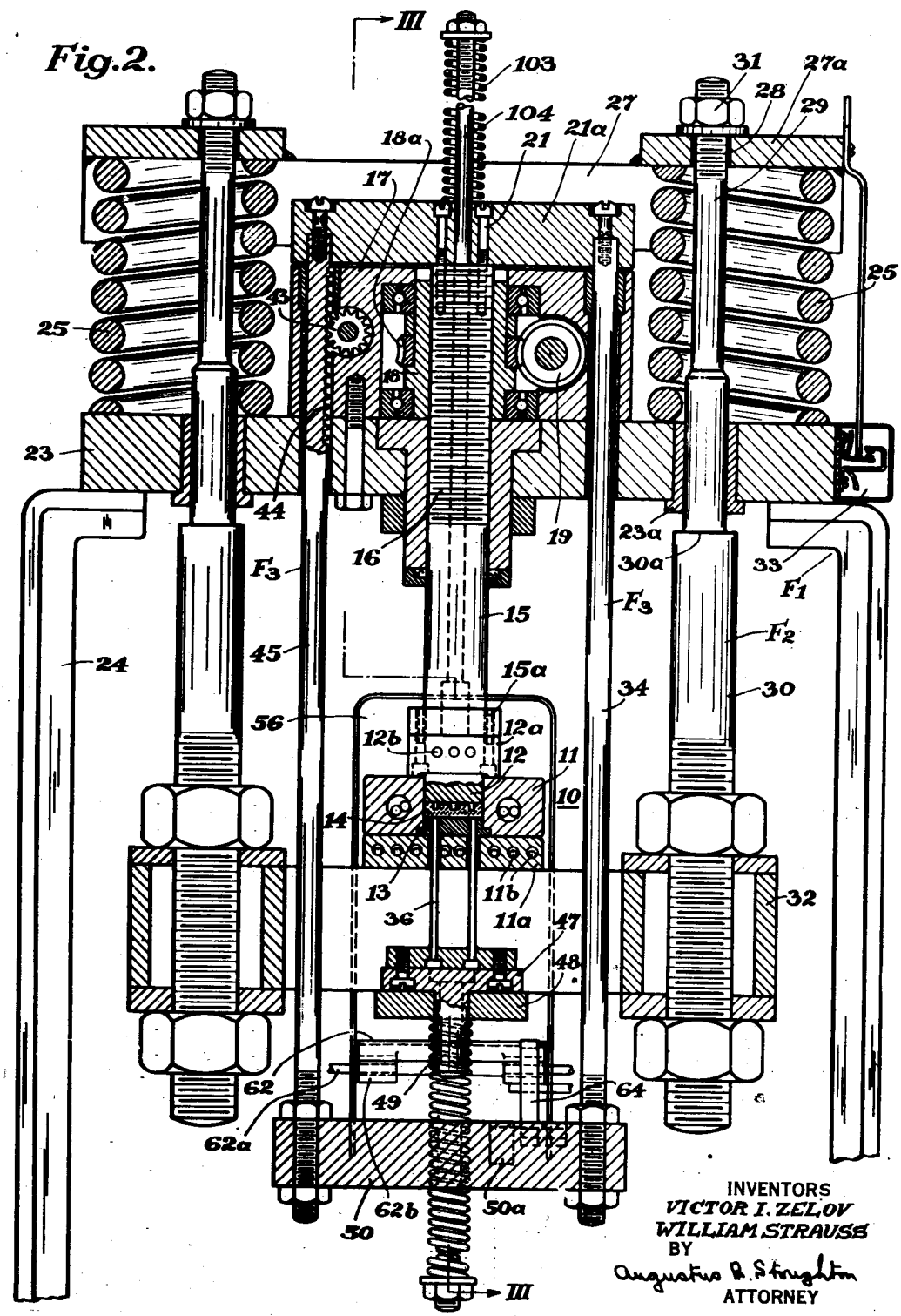

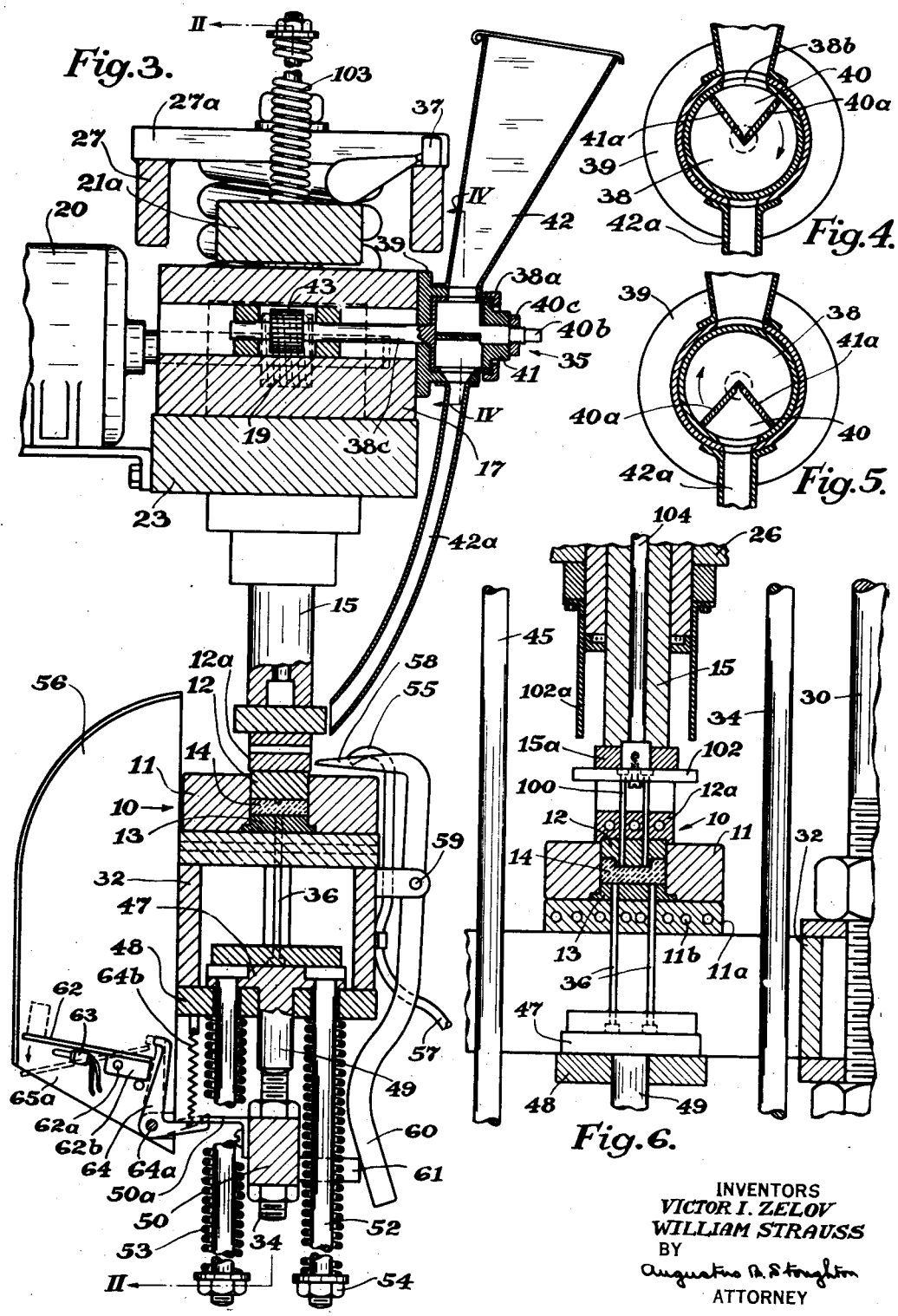

2,242,189

UNITED STATES PATENT OFFICE 2,242,189

AUTOMATIC MOLDING PRESS

Victor I. Zelov, Rosemont, and William Strauss, Philadelphia, Pa., assignors to Molded Insulation Co., Inc., Philadelphia, Pa., a corporation of Pennsylvania Application June 5, 1937, Serial No. 146,550
Renewed October 31, 1939

19 Claims. (Cl. 18—16)

This invention relates to plastic molding machines and, more particularly, to an automatic machine for the molding of finished articles from pulverulent compounds such as, for example, Bakelite, a phenolic condensation product which hardens into the shape of the mold through the application of heat and pressure.

It is one of the objects of the present invention to provide apparatus for automatically manufacturing parts from molding materials, such as the kind referred to, which will be simple in construction and so arranged that each step of the molding cycle may be automatically timed by means of a repeating controller and thereby the errors inherent to manual control eliminated.

One purpose of our invention is to provide a unitary machine which is entirely automatic throughout the molding cycle and suitable for the economical manufacture of parts from molding compounds in the common types of molds, usually referred to as positive, semi-positive, or flash type molds.

Another purpose is to provide a machine which will automatically repeat the molding cycle unchanged and continuously any desired number of times and provided with means for stopping the operation in the event of failure of any part to function properly.

A further purpose of our invention is to apply the simple screw-press principle to a fully automatic plastic molding press by means of a power-driven nut co-operating with a threaded ram, the nut being axially stationary but rotated through suitable means by a reversible motor, whose starting, stopping, reversing, stopping and re-starting is controlled from an adjustable and automatic controller.

It is a further purpose to provide a machine in which certain mechanical functions of the press are tied to the threaded ram and actuated by its movements which are timed through the motor by a controller.

Our machine also includes the novel construction of a receiver safety device, actuated by the molded and ejected article and so interlocked through a switch in the motor-circuit that the repetition of molding cycles depends on the continuance of ejected articles.

Heretofore, in the art of molding parts from plastic material, it has been the general practice to use hydraulic or pneumatic presses fitted with suitable molds comprising a large number of mold cavities so that a large number of identical parts could be finished at the same time for each cycle of operation. These multiple cavity molds are very expensive and can only be used economically for the manufacture of parts in very large lots. Such multiple cavity molds, however, are necessary under the present general practice of manual control because, during the curing time, each press is tied up for a considerable length of time varying from a few minutes to sometimes as long as a quarter of an hour or more, and the production cost would be the same whether a single cavity or a 200-cavity mold was used. During part of this time the operator may be idle unless he is able to take care of several presses. Under such conditions, the cost of small quantity lots, excepting of very large pieces, is prohibitive.

The present practice of depending on manual control for the curing time as well as the time for breathing the mold, when necessary, brings in an element of uncertainty often resulting in defective parts.

Another objectionable feature of the present practice is the common method of manually weighing or measuring out the molding material and then feeding it by hand into the several mold cavities. This requires considerable skill and the exercise of great care in order that each cavity may receive the exact amount of compound, for improperly filled molds will produce imperfect pieces or an excessive amount of flash.

To overcome this last-mentioned difficulty as well as for other desirable reasons, the use of preforms is becoming very common. The economical production of tablets from plastic composition or preforms, however, requires additional special equipment as well as extra handlings of the material.

Through our invention, the above objectionable features are eliminated and a molding press is provided suitable for economical production of parts not only in large quantity lots but in small quantity lots as well, because a simple mold comprising preferably a single mold cavity may be efficiently employed and one identical article after another produced in any desired number without any attention of an operator excepting for the occasional replenishing of the molding compound in the feed hopper.

Some of the novel features embodied in our automatic molding press are:

Automatic measuring of a predetermined quantity of molding material;

Means for conveniently adjusting the measuring valve to vary the capacity according to the die cavity and article molded;

Automatic feeding of the measured material to the mold cavity;

Automatic closing of the mold to a premold-pressure;

Automatic cleaning of the die-face and removal of any surplus molding material lodged on top of the die;

Automatic breathing of the mold;

Automatic temperature control;

Automatic closing and applying of the molding pressure;

Yieldable means for gradually and slowly increasing the pressure to the desired magnitude;

Automatic control of curing time;

Automatic opening of mold and ejection of finished article;

Automatic cleaning of the mold;

A receiver safety device which will stop machine—if the finished article is not ejected, or if feed device fails to fill the die or in case the material is not sufficiently cured to form a solid article;

A warning bell in conjunction with above receiver safety device;

A continuously operating control device provided with means each actuating switches which will start or stop a step of the molding cycle, and thus controls the sequence of operations.

It will be obvious to those skilled in the art to which this invention appertains, that our molding press may be used to equal advantage in producing parts from the variety of molding compounds commonly referred to as cold-molding compositions.

Other objects and advantages of the invention will become apparent during the course of the following description, reference being had to the accompanying drawings wherein a preferred embodiment of one form of the present invention is illustrated.

Referring to the drawings:

Fig. 1 is a front plan view showing our improved molding machine.

Fig. 2 is an enlarged sectional view of our improved apparatus taken on the line II—II of Fig. 3.

Fig. 3 is a sectional view taken on the line III—III of Fig. 2.

Fig. 4 is a sectional view showing the plastic material feeding device in position to receive its charge and is taken on the line IV—IV of Fig. 3.

Fig. 5 is a sectional view showing the material-feeding device but in its discharging position and the parts shown in Fig. 4 are therefore shown correspondingly rotated.

Fig. 6 is a sectional view showing a modification of the mold with stripping means or ejector pins provided in the upper platen.

Fig. 7 is a schematic diagram showing the automatic control or timing device.

Fig. 8 is a front elevation of a suitable controller with parts broken away.

Fig. 9 is a side elevation of the controller with parts broken away.

Referring now to the drawings in detail, there is shown at 10 (Figs. 2, 3 and 6) a mold suitable for the production of articles from plastic materials, such as for example phenolic condensation products, it being common practice in dealing with materials of this kind to supply the mold cavity with the plastic in powder form and then to apply the required pressure and heat for a sufficient time to effect molding and curing. For example, a pressure in the order of 2,000 to 3,000 pounds per square inch and a temperature of about 300° F. may be required for a certain length of time, dependent upon the nature of the material to be molded and size of molded article. The curing time varies with different kinds of material and is also influenced by the size and shape of the article, less time being required for light and thin articles than for heavier ones. The present invention is concerned with mechanical operation of the mold and the mechanical means for applying the pressure and the performance of such other functions as may be necessary to make the machine completely automatic by means of a controller.

The mold 10 is of the conventional type and comprises a die 11, attached to the lower platen 11a with means for supplying heat at 11b, and a punch 12 attached to the upper platen 12a with provision for heat-supply at 12b. Stripping or ejecting pins are shown at 36 (Figs. 2 and 6) for the lower or die member of the mold and at 100 (Fig. 6) for the punch 12. The upper platen 12a is fastened to the flange 15a of the ram 15. In the mold 10, used for illustration, the die 11 is shown with mold cavity 14 into which the punch 12 fits and compresses the plastic material against the bottom plate 13. The heat-supply means for the mold may be any of the usual means, such as electric or steam, the temperature being maintained constant and at the proper degree in the customary way.

In operation, assuming that the molding and curing of an article is completed, the punch 12 is raised and the article ejected from the cavity 14. The latter is then supplied with a new charge of the required amount of plastic material and the punch 12 lowered again into mold cavity so as to exert the required pressure to compress the charge for the required curing time, after which another finished piece is ejected.

The upper platen 12a is carried by a ram 15 having threads 16 engaged by the nut 18, provided with a worm-wheel 18a meshing with the worm 19 and driven by the reversible motor 20. Rotary motion of the motor 20 is converted into rectilinear motion of the ram 15, the latter being restrained from turning in any suitable manner, for example by means of bolts 21.

The reversible motor 20 is carried on a bracket fastened to the upper crosshead 23 of the machine frame 24. The connection for the power supplied and the control of rotation for the motor will be described in detail in connection with the molding cycle.

The lower platen 11a for the mold 10 is supported by and attached to the lower crosshead 32, which is supported from the upper crosshead 23 through a frame F2 comprising the side rods 30, the pressure bar 27, and the intermediary springs 25. For example, we show the machine frame 24 including an upper crosshead 23 against which the lower ends of the springs 25 bear, the upper ends of the latter bearing against plates 27a comprising parts of the pressure bar 27, the plates having openings 28 for the stems 29 of the side rods 30 and permitting these stems 29 to engage with nuts 31 on the upper side of the plates on pressure bar 27. The springs 25 are always exerting a certain tension being initially compressed by the nuts on the stems 29 so that the shoulder 30a is held by the spring tension against the flange of bushing 23a when the ram 15 does not exert pressure on the mold or when the mold 10 is open and the ram in up position as shown in Fig. 1.

The lower portion of the side rods 30 are connected to the lower crosshead 32.

Assuming that the mold cavity 14 is supplied with the required molding material and that the ram 15 is lowered by the motor 20, such lowering motion will continue relatively to the die 11 until punch 12 enters die 11 and compresses the plastic material when continued motion of the ram will cause the mold 10 to move as a unit, pulling down the pressure bar 27 against springs 25 and compressing these springs until the required molding pressure is produced as determined by the setting of switch 33, which then opens the circuit and stops motor 20. The moment the motor stops, the downward motion of the ram is also stopped and the pressure remains constant until the motor again is started either to further lower the ram or to withdraw it.

The parts of the mold 10 are held together under pressure for the required time interval, the heat being maintained at the desired temperature degree; and, after the elapse of the curing time, the circuit for the reverse rotation of the motor 20 is completed by action of controller on relay U in motor-circuit, retracting the plunger 15, the first phase of such movement being used to relieve the tension placed in the springs 25 by the last phase of the forward movement. As the plunger moves upwardly, it carries the frame F3, which actuates the powder-feeding device 35 and the bottom-ejecting parts 36, whereby the stripping of a molded article from the mold cavity 14 and the feeding of a new charge of molding material into the cavity may occur in proper sequence and timed relation with respect to the movement of the ram 15. When the desired limit of upward movement of the plunger 15 and the frame F3 is reached, the controller acts on relay U in the motor-circuit to stop motor 20 and the retraction of ram 15.

The feeding device 35, for supplying measured charges of molding material, comprises a measuring valve 40 formed within a cylinder 38 by adjustable valve-blades 40a and 41a and mounted in a housing 39 attached to the worm-housing 17 on crosshead 23 of frame 24. A valve chamber 40 is thus formed by the bottom and the interior walls of cylinder 38, valve-blades 40a and 41a and cap 41 which has a capacity adjustable for any desired volume within the range of the machine. Blade 41a is attached to cap 41 and blade 40a is fastened to the stem 40b so that they may be adjusted with relation to each other to form a similar or larger valve by turning stem 40b and cap 41 within cylinder 38. After adjustment, the stem 40b is clamped tightly to cap 41 by means of a nut 40c and cap 41 in turn is clamped to cylinder 38 by some such means as a nut 38a, so that all these parts are held together and will turn in housing 39 as a valve unit with cylinder 38. From the above description, it is readily understood how the valve 40 may be changed to form a larger or smaller valve-pocket as needed. For example, the blades may be swung around, back-to-back, to form a valve-pocket the full size of cylinder 38. The valve-pocket 40 communicates through the opening 38b in the wall of cylinder 38 with a feed-hopper 42, at the top of housing 39 as shown in Fig. 4, and with a feed-conduit 42a at the bottom when turned to the position shown in Fig. 6. The feed-conduit 42a extends from the measuring device at 35 to a point just above the face of die 11 and is bent in a suitable shape to deliver the measured quantities of material when discharged by the valve 40 into mold cavity 14. The feed-valve 40 may be turned or oscillated in timed relation with the movements of ram 15 through any suitable means, for example a pinion 43, mounted on an extension 38c of cylinder 38 and meshing with the rack-teeth 44 but in a side rod 45 of frame F3.

During each cycle, the valve-pocket 40 is disposed to receive a charge from the feed-hopper 42 when passing the position shown in Fig. 4 and to discharge this measured charge through the feed-conduit 42a (Fig. 5) into the die cavity 14, the latter event occurring with the ram 15 in elevated position and after the previously molded article has been removed from the mold.

It is very desirable to have uniform charges of molding material delivered to the die cavity each cycle and for that reason various means may have to be employed to take care of the difference in nature and consistency found in the many kinds of molding compounds used in the art of plastic molding. To aid in obtaining charges of uniform density, we have found it helpful to allow the valve 40 to over-travel. By this we mean that, instead of arranging the gearing 43—44 so that the opening 38b in the cylinder 38 would stop as shown in Fig. 4, disposed to receive a charge, and remain in that position during the extended time for curing, we allow opening 38b to pass on and stop near the discharge position shown in Fig. 4 but not turned quite far enough to discharge any of the material in the valve to the feed-conduit. Opening 38b will thereby pass the feed-hopper 42 twice but the material in the valve cavity 40 is only momentarily exposed to the varying head of material in the hopper instead of as otherwise for an extended period of time. When the valve cavity was permitted to remain for an extended period in communication with the feed-hopper, it was discovered that the varying head of material in hopper 42 influenced the density of the material in the valve-cavity 40 in proportion to the amount at the time in hopper 42. On the other hand, it is also in some cases beneficial to attach a vibrator to the hopper 42 or housing 39 in order to speed the flow of material into valve 40 and, on the other hand, aid the discharge into feed-conduit 42a.

In some instances, it is desirable to pre-heat the molding material to a temperature just below the fusing point and suitable heating means (although not shown) may readily be attached to the housing 39 and/or hopper 42. As is well known to those versed in the art, pre-heating of the molding compound decreases the required curing time and thereby increases the efficiency of the machine.

If molding material compressed into preform-tablets or balls are available, the above-disclosed powder-feeding device may, of course, be substituted by an automatic preform feeding device.

To secure removal of an article from the mold cavity 14, the knock-out pins 36 are employed, these pins being carried by a support or holder 47 arranged to abut the plate 48 connected to the crosshead 32 (Figs. 2 and 3). The plate 48 has an opening (Fig. 3) through which extends the push bar 49 arranged to be engaged by the cross-bar 50 adjustably carried by the lower ends of the side rods 34 and 45 of the frame F3. The knock-out holder 47 has rods 52 connected thereto and extending through openings in the crosshead plate 48, each of the rods being surrounded by a spring 53 held in compression between the nuts 54 and the plate 48. At a predetermined point in the upward travel of the plunger 15, as determined by the adjustment of the cross-bar 50, the push-bar 49 is engaged by bar 50 and the knock-out pins are elevated to eject a molded article from the cavity 14. At the same time, springs 53 are compressed and, when the cross-bar 50 moves down, the force of the springs is effective on the knock-out holder 47 to pull the pins down out of the cavity 14 and to place their ends level with the bottom of the mold cavity 14. Springs or some other similar means of sufficient power must be used for this purpose because of the large amount of friction encountered when the pins pass through the mold bottom 13, it being necessary to make the fit fairly tight for the knock-out pins because of the high molding pressure.

For certain types of molds, it also is desirable to provide knock-out pins or strippers for the punch 12 as well. These may be arranged in some such manner as shown in Fig. 6, the strippers 100 being carried by a bar 102 attached to the head of rod 104, extending up through a hollow ram 15 and supported by threads on rod 104 engaging a nut which rests on and compresses a spring 103 against the bar 21a of the frame F3. The action of strippers 100 may be as follows: the bar or stripper holder 102 may extend out beyond the flange 15a of ram 15; as the ram 15 is raised, stripper holder 102 will engage the abutments 102a at a predetermined point in the cycle; and the article is stripped from the punch 12 while at the same time spring 103 is further compressed against bar 21a in order that sufficient tension may be stored up for the return of the strippers 100 to their positions in the punch 12, when the ram again is lowered to close the mold 10.

To insure a clean mold and to reduce flashing, blasts of compressed air are used with the mold by means of a supply conduit 55 whose discharge end is directed so as to blow across the die face 11. With punch 12 retracted, the blasts also clean the cavity 14. This event is preferably timed to occur after the article is lifted from cavity 14 by the knock-out pins, the blast blowing the article into the receiver 56. A blast is also provided just after punch 12 enters die cavity 14 so as to blow off any excess powder about upper face of die 11. Thus, during each cycle, two blasts occur: one to clean the mold and to eject an article; and the other to remove excess powder on the die 11 before the parts are in the curing position. The conduit 55 is provided with a valve 57 (not shown on the drawings excepting in the diagrammatic view Fig. 7). It may be any suitable valve with electric control and attached any suitable place either on crosshead 32 or frame 24. This valve is then actuated by the controller as indicated in Fig. 7, so as to secure the event described above in timed relation.

In addition to the air blast for ejection of molded articles, we have found it desirable in certain cases, for example when molding large thin articles, to provide a mechanical knock-off or ejector 58 pivoted at 59 and having its lower end formed to provide a cam-surface 60 engaged by the abutment 61 on the cross-bar 50; thus, if the blast is insufficient to remove the article into the receiver 56 after being ejected by the knock-out 36, the knock-off agitates the article on the pins and aids the removal by the air. The knock-off 58 is also of service in cases where the article is lifted out by the punch 12 and stripped from the punch after clearing the face of die 11. In this case, the action of 58 is arranged so that it will enter over the cavity 14 and prevent the article from falling into and getting caught in the cavity.

The receiver 56 includes a safety device in the form of a trap 62, which is interlocked through a switch 63 in the motor circuit of the controller, so that the failure of a continuity in the discharge of molded articles will stop the machine and thus prevent damage to any of the parts. For example, if a molded article should remain in cavity 14, stick on the punch 12 or fall back into the cavity and a second charge of molding material delivered to the cavity, serious damage may be done to the mold and other parts of the machine unless the cycle of operation was stopped at the proper time. In a machine constructed for automatic operation and therefore operating without constant attention of an operator, many other accidents may occur and must be guarded against. The heat-supply to the platens may fail, in which case the molding also would fail with the probable result of the knock-out pins merely piercing the article in the mold, instead of ejecting it, and subsequently a second and third charge delivered on top of the first would cause damage to the mechanism. It is also conceivable that an attendant may neglect filling the feed-hopper and thus allow the machine to idle for some time unless the machine is automatically stopped, and a warning of some kind, for example a bell 95a, is given.

The receiver safety device 56 is mounted on the lower crosshead 32 in a suitable position to receive the ejected article as it is blown off the die 11. A preferred embodiment of the device is shown in Fig. 3. The molded article, entering the receiver 56, comes to rest on the counterbalance platform or trap 62 which is pivoted at 62a, and the weight of the article tilts the trap 62 down, thus closing a branch of motor-circuit through the switch 63, insuring the continuance of the molding cycle. The article is then discharged from the trap through opening 65a by the further tilting of the trap.

When latch 64 is pressed back by extension 50a on bar 50, latch 64 releases trap 62 and permits it to open wide enough for the molded article to slide out of receiver 56 through the then open bottom 65a. The withdrawing of latch 64 for release of trap 62 takes place as the bar 50 is brought back to its lower position by frame F3 at the closing of mold 10. As soon as trap 62 is relieved of the weight of the molded article, it will swing back to the normal position shown in Fig. 3 by virtue of the counterbalance 62b. Latch 64 is fulcrumed at 64a and has an arm of suitable length to engage extension 50a, while the other arms has provision for engaging the near side of trap 62 and locking it in a position induced by a molded article suitable for the closing of the safety circuit through switch 63. At the end of the curing time when the ram 15 retracts to open the mold 10, the frame F3, and with it the bar 50, is lifted to eject the molded article. The lifting of bar 50 and its extension 50a permits the spring 64b to pull the latch forward to such a position that the near side of the trap 62 will engage and become locked in the closed position of the circuit if a molded article is discharged into receiver 65 and induces the tilting of trap 62. Thus, by the action of this latch, the article is not discharged at once but retained in receiver 65 for a sufficient length of time to give the interlocked switches of the controller ample time to function. It is, of course, understood that, with trap 62 in normal position, the circuit through switch 63 is open and will remain open continuously unless acted on by a discharged article. If switch 63 remains open during the retraction of ram 15, it has the effect of stopping the motor operating the controller, because the switch in this motor-circuit is so interlocked with switch 63 that either one or both must be closed in order to continue the operation. At a suitable time in the molding cycle, the controller opens the switch in this motor-circuit and, if switch 63 is also open, the controller stops. At the same time, another circuit is closed through the alarm bell which will continue to sound the alarm until stopped by the operator.

As mentioned above, pre-heating of the molding compound is desirable as it decreases the required curing time and, in addition, it liberates a portion of the gases in the material. Some molding compounds contain a large percentage of volatile material which, if not expelled during the curing of the article, will cause blisters and porous sections in the finished article. To prevent blistering, we provide means for breathing the mold by suitable switches in the controller, which will halt the downward movement of the ram shortly before the mold is completely closed but at a point where the punch will exert some pressure (pre-mold pressure) on the charge, aiding and speeding a thorough heating of the charge in the cavity, retracting the punch to relieve the charge of all pressure, dwelling at the point of retraction a suitable length of time to give the gases generated by the heat and the temporary pressure a chance to escape, and then again closing the mold for the final curing time.

The machine may be controlled in any suitable manner as, for example, by means of automatic time switches of which there are several now available on the market. Such a time switch embodying a sufficient number of independently operated but interlocked devices for opening and closing circuits in conjunction with the limit switches 33 and 37 as well as safety switch 63 may, in a general way, meet the requirements as diagrammatically shown in Fig. 7. The motor control switches U and D, operated through one or more of the time switches or the limit switches suitably interlocked with safety switch 63, determine the direction of rotation of the motor for up-and-down movement of the ram 15. The starting and stopping of the air blast through valve 51, which may be of the solenoid operated type, must be controlled by time switches in exactly timed relation with other steps in the molding cycle.

The ordinary time switches are usually constructed with open contact-points and the make-and-break mechanism is operated by means of adjustable cams mounted on a common cam-shaft rotating at a speed of one revolution for the desired time cycle. The open contacts, while extensively used, are subject to considerable wear and damage from arcing, which impairs their efficiency and shortens their useful life, particularly in an automatic and continuously operating device. The cams are difficult to adjust and, unless they are made very large in diameter, great skill is required in making the adjustments so as to keep the error or time lag down to a small fraction of the time cycle.

In order to obtain the highest efficiency from our automatic molding press, and to eliminate some of the faults found in most commercial timing devices as well as to provide greater convenience in making adjustments, we have developed a controller which more fully meets the requirements of a continuously operating device. In Figs. 7, 8 and 9 are shown an embodiment of a suitable controller, including several new and novel features, which provides ample space for the convenient setting of the devices that open-and-close the several switches in timed relation so that lost time may be kept down to a very small fraction of the time cycle.

Referring now to Figs. 7, 8 and 9, there are shown a number of switches 111 (represented as contacts 92, 96, 97, etc., in Fig. 7) preferably of the kind known as the mercury vacuum sealed type, attached to individual holders 115, which are mounted on a fulcrum 118, extending from the frame 105 in such a manner that the holder can swivel or tilt when urged by the switch finger 110a and remain in that position, being restrained by some form of a retainer 119 until the corresponding finger 108a returns it to the original position. Each switch 111 is connected in the customary manner to its proper circuit by means of the flexible leads 112 and 113.

The switch-actuating mechanism may consist of a plurality of bars 70, 71, etc., two for each switch, pivotally attached to a lever 108 at the top and 120 at the bottom, a pair for each bar, and forming a linkage for the actuation of the switch. These levers are free to swivel on their respective shafts 109 and 121, which are attached to the side members of frame 105. Springs 78, 79, etc., yieldably urge bars 70, 71, etc., against a stop 106 of frame 105 to limit their movements. Each lever 108 and 110 has an extension (switch finger) 108a, 110a, etc., suitable to contact abutments 116, 116a, etc., on switch holder 115 and by such action tilt holder 115 in a position which either opens or closes the circuit through switch 111. On bars 70, 71, etc., are placed one or more adjustable dogs 70a, 70b, 71a, 71b, etc., respectively, and the location of these dogs on the bars determine the point in the molding cycle at which a switch 111 opens or closes a circuit. The dogs may be made in any suitable manner as, for example, in the form of an arm 122 extending out from the bar and provided with a bevel 122a at one end, a suitable recess at the other end fitting over the bar and threads or the like engaging a nut or screw 123 for clamping and holding the dog at the desired position on the bar. The dogs are actuated to move their respective linkage by one or more control rods 86, carried by endless belts or chains 87 and 88 engaging upper and lower pulleys or sprockets 87a, 87b and 88a, 88b, respectively, mounted on shafts 124 and 125 which have their bearings in the side members of frame 105. The sprocket 88b is driven from a motor 89, through a train of change gearing 90, comprising one or more interchangeable gears 126, 127 and 128, chosen so as to secure a suitable speed of travel for chains 87 and 88, which will result in a complete lap for control rod 86 around its track each cycle regardless whether the duration of the cycle suitable for the curing time is two, three or more minutes or a fraction of a minute. If a time cycle of five and one-half (5½) minutes is desired, suitable gears are selected and mounted at 90 to cause the control-rod 86 to make one lap in that time. On one side of the lap it will be noticed that the control rod 86 is merely idling, this being the curing time, while on the other side it contacts one dog after another, thus opening and closing circuits in timed relation. The order of operation of the dogs is indicated in Fig. 7 by the underscored numerals 1 to 12, inclusive.

The frame 105, which contains and supports the controller, may be part of frame 24 or attached to crosshead 23 along side motor 20 as shown in Fig. 1.

Assuming the end of the curing phase whose duration depends upon the idle travel back and up of the control rod 86 from the last to the first of the dogs, the bar engages the dog 70a to close the contacts 92 of the control circuit for "up" relay U, the control circuit extending from line $L_3$ through relay U, limit switch 37, switch contacts 92 and 94 and back to line $L_1$ through line $L_{1a}$. Operation of relay U causes the motor 20 to turn in a direction to move the plunger 15 upwardly to open the mold.

After operating dog 70a, bar 86 next engages the dog 76a to close the contacts 93 of a circuit including the leads $l_4$, $l_5$, and $l_6$, resulting in opening of the valve 57 to provide the air blast for cleaning the mold and securing discharge therefrom of a molded article. The blast continues until rod 86 engages the dog 77a to open the controls 93.

The bar 86 next engages the dog 75a to open the switch 94, disconnecting the line side $L_{1a}$, through the leads $l_8$, $l_7$ and $l_3$, to the line side $L_{3a}$, the line side then remaining connected through the leads $l_3$, $l_9$ and the switch 63. Unless, therebefore, the switch 63 is weighted closed by an article, as soon as the switch 94 is opened, the relay 95 is rendered ineffective and the circuit to the timing motor 89 is interrupted and a warning signal is given, if desired, and the machine stops. If switch 63, however, was closed, the rod 86 continues and engages the dog 74a to close the switch 94 again.

The rod then engages the dog 71a to close the controls 96 connecting lead $l_2$, through lead $l_{10}$, and closed contacts 97 and lead $l_{11}$, through the limit switch 33 and relay D to operate the motor 20 to move the plunger 15 downwardly.

The dog 76b is next actuated to close contact 93 of the circuit including leads $l_4$, $l_5$ and $l_6$ to open valve 57 just after the punch 12 enters die cavity 14, for the purpose of removing any powder on top of die 11. This circuit is opened again almost instantly by the action of dog 77b.

When it is desired to de-gas or "breathe" the mold, this is accomplished by placing a dog at 73a to open the circuit including leads $l_{10}$, $l_{11}$ and limit switch 33 to stop motor 20 and thereby stop the downward motion of ram 15, and then reverse the motor rotation to secure upward motion of ram 15 by action of dog 70b closing contact 92. The upward motion of ram 15 is stopped by operation of dog 71b. The upward motion is only continued for a very short time period, as may be seen from the relative positions of dogs 70b and 71b. It is preferable to limit the upward motion a distance just sufficient to relieve the pressure, and retain the punch 12 at that position in the cavity 14. The control rod 86 actuates dog 71b at that point to open contact 92 and stop the motor 20. At the end of the desired breathing period, the control rod 97 engages the dog 72a, closing contact 86 and thereby completing the circuit through limit switch 33 again for the final closing of the mold 10. The motion to close the mold is interrupted as recited above by limit switch 33.

Briefly, the cycle of operation for our machine may be described as follows: Assuming that the curing period is finished as set on the controller, this latter then starts the motor 20 rotating in a reverse direction to retract the ram 15, which opens the mold 10 and the molded article is ejected and blown into receiver 56, the ram continuing the upward motion until the limit for this is reached as set on the controller and motor 20 is stopped. During the last phase of the upward travel of the ram 15, the feed valve 40 is turned by the action of frame F3 on pinion 43 so that opening 38b of valve 40 passes the entrance to feed conduit 42a and a charge of molding material is delivered into the mold cavity 14. Without any further delay than may be required for the motor 20 to come to rest, the controller closes another circuit and starts motor 20 in the direction for lowering ram 15, the circuit remaining closed until the punch 12 has entered the mold cavity 14 and exerts the premold-pressure on the material confined in cavity 14. At this point, the controller may be set to stop the downward travel of ram 15 and reverse the motor so as to retract ram 15 and with it punch 12 a sufficient distance to relieve the pressure in cavity 14 momentarily and stop the travel of the ram at this point for breathing of the mold. As the punch 12 enters the cavity 14, the controller opens air valve 57 and a blast of air from nozzle 55 cleans off any grains of powder that may be lodged on top of the die 11. At the end of the desired breathing period, the controller again starts the motor 20 to lower ram 15 and close the mold 10 for the curing period at curing pressure. This time the travel downward of ram 15 is stopped through the stopping of motor 20 by means of limit switch 33. During the last phase of the downward movement of ram 15, extension 50a on bar 50 releases latch 64 and thereby opens trap 62 to discharge the previously molded article. Trap 62 then returns to normal position to open the safety circuit through switch 63. At the finish of the desired curing period as set on the controller, the motor 20 is started by the controller to open the mold 11 and the knock-out pins 36 carried on frame F3 lift the article out of the cavity 14. As the article reaches the surface of die 11, the controller opens air valve 57 and the blast discharges the article into receiver 56, at the same time cleaning the cavity 14 and face of die 11. The time period during which valve 57 is open is limited because a new charge should be delivered to the cavity 14 as quickly as possible and the air must be shunt off before this event takes place. The controller must, therefore, be of such construction as to provide rapid control within very narrow limits and provide means whereby this valve may be opened to produce a strong air blast and shut almost instantly again.

We have also provided a stop switch 37 (Figs. 3 and 7) which will act to stop motor 20 should the controller fail and thus allow the ram 15 to continue on its upward travel beyond the safe and desired limit. This stop-switch 37 is normally closed and may be mounted on pressure bar 27 in such a position that, if the ram 15 overtravels, the cross-bar 21a on ram 15 will contact the switch-lever, open the circuit and stop motor 20.

From the foregoing, it will be apparent that we have provided a machine in which a plastic molding material is supplied to a mold, is compressed, molded and ejected entirely automatically; and in which, should the sequence of operation be interrupted, the machine will be automatically stopped.

While we have shown in the drawings a suitable embodiment of our invention, it is apparent that many modifications may be made without departing from the principles shown and disclosed.

We do not intend to be limited save as the scope of the prior art and of the attached claims may require.

We claim:

1. A machine for molding articles from plastic molding material comprising, in combination, a mold having a movable part whereby said mold may be opened and closed, means for supplying a charge of molding material to the mold, means for ejecting the molded article from said mold, operating means for opening and closing said mold and for actuating both of said means in timed relation to each other, means tending to stop the operation of said operating means after an article is ejected from said mold, and means controlled by an article as it is ejected from said mold for rendering said stopping means ineffective.

2. A machine for molding articles from plastic molding material comprising, in combination, a mold having a movable part whereby said mold may be opened and closed, means for supplying a charge of molding material to the mold, means for ejecting the molded article from said mold, operating means for opening and closing said mold, control means for actuating all of aforesaid means in timed relation with each other to mold an article and eject the article from said mold, means tending to stop the operation of said operating means after an article is ejected from said mold, and means for receiving said ejected article including a control device controlled by said ejected article for effecting the operation of said operating means through another molding cycle.

3. A machine according to claim 2 and including means rendered operative after each operation of said control device for conditioning said device, for operation by an article discharged in the next molding cycle.

4. A machine for molding articles from plastic molding material comprising, in combination, a mold having a movable part whereby said mold may be opened and closed, operating means for operating said movable part through a complete cycle to mold an article and discharge said article from said mold including means operated in timed relation with said movable part for supplying a charge of molding material to the mold and means for discharging the molded article from said mold, said operating means being effective to operate throughout a complete cycle when once started to mold and discharge an article, and means for receiving said discharged article including a control device controlled by said discharged article for starting another cycle of said operating means.

5. A machine for molding articles from plastic molding material comprising, in combination, a mold having a movable part whereby said mold may be opened and closed, operating means for operating said movable part through a complete cycle to mold an article and discharge said article from said mold including means operated in timed relation with said movable part for supplying a charge of molding material to the mold and means for discharging the molded article from said mold, said operating means being effective to operate throughout a complete cycle when once started to mold and discharge an article, a chute for receiving said discharged article, a tiltable barrier normally biased to a position across the path of travel of said article in said chute and being tiltable by said article in its passage through said chute, and means controlled by the tilting of said barrier for effecting the operation of said operating means through another cycle.

6. A machine according to claim 5 wherein the means for discharging the molded article from the mold includes a reciprocating knockout pin, means for operating said knockout pin to free the molded article from the mold parts, and an air jet arranged to convey the ejected article from said knockout pin into said chute and thus into contact with said tiltable barrier.

7. A machine for molding articles from plastic molding material comprising, in combination, a mold having a movable part whereby said mold may be opened and closed, operating means for operating said movable part through a complete cycle to mold an article and discharge said article from said mold including means operated in timed relation with said movable part for supplying a charge of molding material to the mold and means for discharging the molded article from said mold, said operating means being effective to operate throughout a complete cycle when once started to mold and discharge an article, a chute for receiving said discharged article, means including a tilting plate arranged in said chute for receiving said discharged article, said plate being normally biased to a substantially horizontal position and being tiltable under the weight of said article, and means controlled by the tilting of said plate for initiating another cycle of operation of said operating means.

8. A machine for molding articles from plastic molding material comprising, in combination, a mold having a movable part whereby said mold may be opened and closed, operating means for operating said movable part through a complete cycle to mold an article and discharge said article from said mold including means operated in timed relation with said movable part for supplying a charge of molding material to the mold and means for discharging the molded article from said mold, said operating means being effective to operate throughout a complete molding cycle when once started and including means tending to stop the operating means after the discharge of an article, a safety device for receiving said discharged article, a substantially horizontal plate arranged in said safety device for receiving said discharged article, said plate being normally biased to an upper position and being movable by the weight of said article to a lower position where the article is retained on said plate, means controlled by the movement of said plate to said lower position for rendering said stopping means ineffective, whereby said operating means is effective to operate through another molding cycle, and means rendered operative by the continued operation of said operating means for discharging said article from said plate.

9. A machine according to claim 8 wherein said plate is mounted for tilting movement and the means for discharging the article from the plate comprises means for effecting tilting of the plate to a position where the article slides from the plate by gravity.

10. A machine for molding articles from plastic molding material comprising, in combination, a mold having a movable part whereby said mold may be opened and closed, means for supplying a charge of molding material to the mold, means for ejecting the molded article from said mold, operating means for opening and closing said mold, a controller for controlling the operation of all aforesaid means in timed relation with each other to mold an article and eject the article from said mold, means for operating said controller through successive cycles, means tending to stop the operation of said controller after operation of said ejecting means in each molding cycle, means for receiving said ejected article including means controlled by said article for rendering said stopping means ineffective.

11. In an automatic press for molding articles of plastic material, the combination of a mold having a movable part for opening and closing the mold, power means for driving said movable part, electric means for controlling said power means including a circuit for opening said mold and a circuit for closing said mold, means for energizing said circuits in sequence to open and close said mold, means operable during opening of said mold for discharging a molded article from said mold, means operable during opening movement of said mold tending to interrupt said opening circuit for an interval of time, means controlled by said discharged article for preventing the interruption of said opening circuit during said interval of time, and means operable after the discharge of said article for feeding a charge of molding material to said mold.

12. A machine for molding articles from plastic material comprising, in combination, a mold including a lower mold part having a mold cavity formed therein and an upper mold part having a punch positioned to enter said mold cavity, one of said mold parts being movable to open and close the mold, power means for raising and lowering said movable mold part to open and close said mold, means providing a supply of molding material elevated above said cavity, a conduit leading from said material supply means to a point above said mold cavity but out of the path of travel of said movable part and positioned to direct molding material directly into said cavity by the free and unconfined fall of said material from the end of said conduit, a measuring valve for releasing a predetermined quantity of material from said supply into said conduit, means for operating said measuring valve in timed relation with the movement of said movable part to supply a charge of molding material to said mold cavity when said mold is open, air supply means for directing a blast of air between said mold parts, and means operated in timed relation with the movement of said movable part for rendering said air supply means operative after said punch enters said cavity to blow excess molding material from between said mold parts.

13. In a machine for molding plastic articles, upper and lower platens, said platens having a mold cavity therebetween, springs supporting said lower platen, a motor, means driven by said motor for raising and lowering the upper platen, means driven by said motor through said first-mentioned means for ejecting an article from the lower platen when the platens are separated, means driven by said motor through said first-mentioned means and effective after ejection of an article for feeding a measured quantity of plastic molding material into the mold cavity, means rendering the motor effective for lowering the upper platen, means for removing excess molding material when the upper platen approaches the lower one, said springs being located so as to be compressed upon abutment of the platens, and means for stopping the motor upon a predetermined spring compression.

14. Apparatus for molding articles from plastic molding material comprising, an upper platen carrying a punch co-operating with a die carried on a lower platen, a ram supporting said upper platen, a motor for raising or lowering said ram, an upper cross-head carrying said motor, springs stressing said lower platen towards said upper platen, means connecting said motor with said ram, a frame connected to said ram, means associated with said frame for ejecting a molded article, means for discharging ejected articles from adjacent said mold, a receiver located adjacent said platens for receiving discharged articles, a controller operating said motor and thus the apparatus through a predetermined molding cycle, a second motor driving the controller, a feed valve driven from said first motor through said ram for feeding a measured quantity of molding material into said die, means on said controller governing said first motor so as to render said first motor effective for lowering the ram, said ram pressing against said platens against the stress of said springs for holding the molding material under pressure in the mold after said first motor has been stopped, means on the controller governing said first motor effective in raising the ram and ejecting the molded article, means for cleaning the die and mold cavity, and means for stopping said second motor upon the failure of said means for discharging ejected articles to discharge an article.

15. In an automatic press for molding articles of plastic material, the combination comprising, a controller motor, a controller operated by said motor in repeated, predetermined cycles, a reversible motor operated under the control of said controller according to the cycles of said controller, a mold comprising relatively movable parts defining a mold cavity, one of said parts being movable in response to the movements of said reversible motor so as to compress an article in said cavity, an element having a portion movable adjacent said mold and operated through an intermediate mechanism by said reversible motor when said mold is open to remove a molded article from said mold, means for feeding a charge of molding material into said mold cavity in each molding cycle, and a pivoted device biased in one direction and responsive in the opposite direction to the weight of said molded article removed from said mold and controlling the continued operation of said press in response to a continuous supply of said molded articles.

16. In an automatic press for molding articles of plastic material, the combination comprising, a pair of platens defining a mold cavity between them, a frame mounted adjacent said platens and movable so as to eject an article from said mold cavity when said platens are apart, and a lever mounted adjacent said platens and having one end arranged to move into and out of engagement with an article ejected from said mold when said platens are open and having its other end arranged for contact with said frame when said frame moves to eject an article from said mold.

17. Plastic molding apparatus comprising in combination, upper and lower platens including a punch and a mold, a ram for raising and lowering the upper platen, an upper cross-head, a lower cross-head supporting the lower platen, springs supporting the lower cross-head upon the upper cross-head, a frame attached to the ram, ejectors slidably mounted in one of said platens and actuated by the frame to project from a face of the platen, a motor carried by said upper cross-head, a controller connected to said motor so as to control its operation, a feed valve actuated by said frame for delivering a measured quantity of the material to be molded to the die cavity when platens are separated, means for rendering the motor effective to lower the upper platen causing the punch to compress the material in the cavity, and means responsive to the force exerted between said platens for stopping said motor, said ram pressing said upper platen against said lower platen and holding said platens against pressure of said springs during the curing time, said controller governing said motor so as to render said motor effective to raise said upper platen.

18. Plastic molding apparatus comprising in combination, upper and lower platens including a punch and a mold, a ram for raising and lowering the upper platen, an upper cross-head, a lower cross-head supporting the lower platen, springs supporting the lower cross-head upon the upper cross-head, a frame attached to the ram, ejectors slidably mounted in one of said platens and actuated by the frame to project from a face of the platen, a motor carried by said upper cross-head, a controller connected to said motor so as to control its operation, a feed valve actuated by said frame for delivering a measured quantity of the material to be molded to the die cavity when platens are separated, means for rendering the motor effective to lower the upper platen causing the punch to compress the material in the cavity, means responsive to the force exerted between said platens for stopping said motor, said ram pressing said upper platen against said lower platen and holding said platens against pressure of said springs during the curing time, said controller governing said motor so as to render said motor effective to raise said upper platen, means mounted adjacent said punch and said mold for contacting with a molded article when said punch and said mold are separated and for aiding in the removal of said molded article from the apparatus, a receiver located adjacent said platens, means for discharging the ejected article into the receiver, a motor connected to said controller so as to operate said controller, and means for stopping said motor upon failure of the discharging means to discharge an article.

19. A machine for molding articles from plastic molding material comprising in combination, a frame supporting a mold including a platen having a mold cavity and a reciprocating ram cooperating therewith, a reciprocating knock-out pin supported in said platen below said mold cavity, means operated by said ram in the early part of its opening movement for operating said knock-out pin to eject a molded article from said cavity, a lever pivotally supported upon said frame and having one end thereof adapted to swing transversely over the opening of said mold cavity and the other end thereof having a cam surface formed thereon, cam means operated by movement of said ram after operation of said knock-out pin for operating said pivoted lever to discharge the molded article from said mold, a container for molding material supported on said frame, a feed valve attached to said container for delivering a measured quantity of molding material to said mold cavity, and means operated by said ram during the latter part of its opening travel for actuating said feed valve to deliver a measured quantity of material to said mold cavity.

VICTOR I. ZELOV.
WILLIAM STRAUSS.